(12) United States Patent
Makita

(10) Patent No.: US 8,630,261 B2
(45) Date of Patent: Jan. 14, 2014

(54) COMMUNICATION METHOD FOR DETERMINING THE START OF A HANDOVER AND RADIO APPARATUS USING THE METHOD

(75) Inventor: Takaaki Makita, Gifu (JP)

(73) Assignee: Kyocera Corporation, Kyoto (JP)

( * ) Notice: Subject to any disclaimer, the term of this patent is extended or adjusted under 35 U.S.C. 154(b) by 658 days.

(21) Appl. No.: 12/921,132

(22) PCT Filed: Jan. 9, 2009

(86) PCT No.: PCT/JP2009/000087
§ 371 (c)(1),
(2), (4) Date: Sep. 3, 2010

(87) PCT Pub. No.: WO2009/110165
PCT Pub. Date: Sep. 11, 2009

(65) Prior Publication Data
US 2011/0007710 A1 Jan. 13, 2011

(30) Foreign Application Priority Data
Mar. 6, 2008 (JP) ................................ 2008-056696

(51) Int. Cl.
*H04W 4/00* (2009.01)

(52) U.S. Cl.
USPC ........... 370/331; 370/310; 370/328; 370/329; 370/332; 455/403; 455/421; 455/436; 455/437; 455/438; 455/439; 455/440; 455/441; 455/442; 455/443; 455/444

(58) Field of Classification Search
None
See application file for complete search history.

(56) References Cited

U.S. PATENT DOCUMENTS

| 2001/0030949 A1* | 10/2001 | Molno et al. ................. 370/329 |
| 2002/0045448 A1* | 4/2002 | Park et al. ..................... 455/436 |
| 2003/0002470 A1* | 1/2003 | Park et al. ..................... 370/342 |
| 2004/0097234 A1* | 5/2004 | Rajkotia et al. ............... 455/442 |

FOREIGN PATENT DOCUMENTS

| EP | 1026906 | 8/2000 |
| JP | 2003-319430 | 11/2003 |
| JP | 2004-015518 | 1/2004 |
| JP | 2004-328593 | 11/2004 |
| JP | 2007-300212 A | 11/2007 |
| WO | WO-00/01174 | 1/2000 |

OTHER PUBLICATIONS

ARIB Standard RCR STD-28-1 "Personal Handy Phone System" Version 4.1 (1/2), pp. 10-12.
International Search Report for PCT/JP2009/000087, mailed on Apr. 14, 2009, 2 pages.

(Continued)

Primary Examiner — Hassan Phillips
Assistant Examiner — Gautam Sharma
(74) Attorney, Agent, or Firm — Duane Morris LLP

(57) ABSTRACT

A notification unit conveys a transmit timing of a signal to a target radio apparatus. A receiver receives the signal transmitted from the target radio apparatus with a neighborhood of the transmit timing conveyed. A demodulation unit derives a difference between the receive timing and an estimated timing. A determining unit determines a new transmit timing for the target radio apparatus, based on the difference and outputs the new transmit timing determined to the notification unit. When a state in which the receive timing lags the estimated receive timing occurs more than a predetermined frequency, the determining unit instructs the target radio apparatus to start a handover.

4 Claims, 17 Drawing Sheets

(56) References Cited

OTHER PUBLICATIONS

International Preliminary Report on Patentability for PCT/JP2009/000087, issued on Oct. 12, 2010, 5 pages.
Office Action (translation) for KR 10-2010-7021759, mailed Jan. 2, 2012, 4 pages.
Notification of Reason(s) for Refusal for Japanese Patent Application No. 2008-056696, mailed Apr. 3, 2012, 4 pages (including English translation).
Decision of Refusal, dated Jan. 8, 2013 from corresponding Japanese Patent Application No. 2008-056696.

* cited by examiner

FIG.4

| | | | | | |
|---|---|---|---|---|---|
| 1 | | | GS | | |
| 2 | SS | DS | | DS | |
| 3 | SS | DS | | DS | |
| 4 | SS | DS | ......... | DS | |
| 5 | SS | DS | | DS | |
| 6 | SS | DS | | DS | |
| 7 | SS | DS | | DS | |
| 8 | TS | | PS | | |
| 9 | SS | DS | | DS | |
| 10 | SS | DS | | DS | |
| 11 | SS | DS | ......... | DS | |
| 12 | SS | DS | | DS | |
| 13 | SS | DS | | DS | |
| 14 | SS | DS | | DS | GT |
| 15 | | | GS | | |
| 16 | SS | DS | | DS | |
| 17 | SS | DS | | DS | |
| 18 | SS | DS | ......... | DS | |
| 19 | SS | DS | | DS | |
| 20 | SS | DS | | DS | |
| 21 | SS | DS | | DS | |
| 22 | TS | | PS | | |
| 23 | SS | DS | | DS | |
| 24 | SS | DS | | DS | |
| 25 | SS | DS | ......... | DS | |
| 26 | SS | DS | | DS | |
| 27 | SS | DS | | DS | |
| 28 | SS | DS | | DS | |
| 29 | | | GS | | |

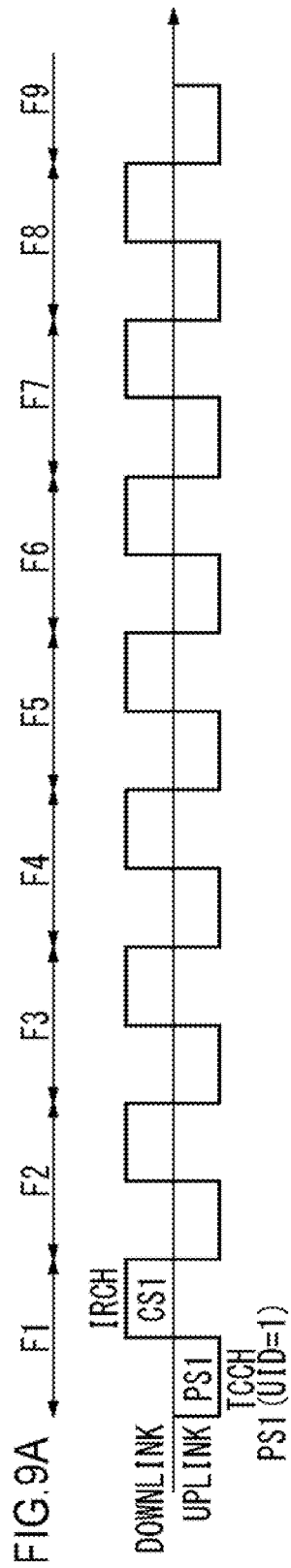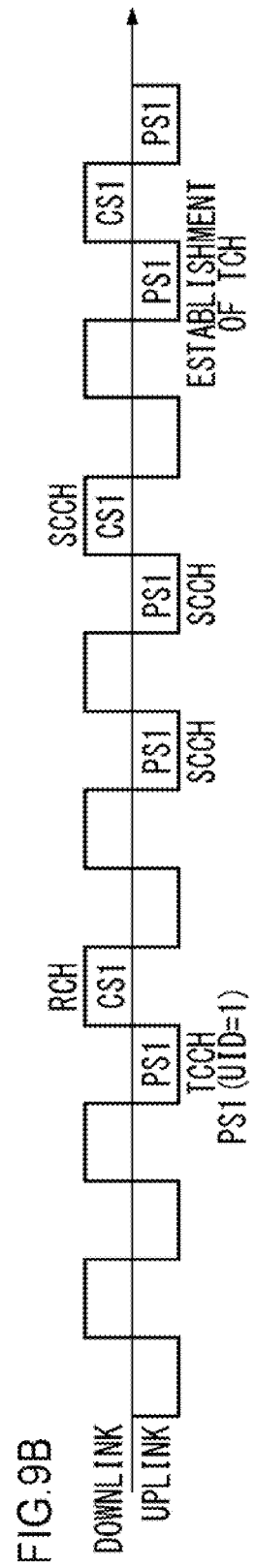

COMMUNICATION METHOD FOR DETERMINING THE START OF A HANDOVER AND RADIO APPARATUS USING THE METHOD

CROSS-REFERENCE TO RELATED APPLICATIONS

This is a U.S. National Phase Application of International Application No. PCT/JP2009/000087 filed Jan. 9, 2009, which claims priority to Japanese Patent Application No. 2008-056696 filed Mar. 6, 2008, the disclosures of which are incorporated herein by reference in their entirety.

TECHNICAL FIELD

The present invention relates to a wireless communication technology and more particularly to a communication method for determining the start of a handover for a radio apparatus, which is a target apparatus to be communicated with, and a radio apparatus using said method.

BACKGROUND TECHNOLOGY

A logical control channel (hereinafter referred to as "LCCH") is prescribed in a mobile communication system, such as a second-generation cordless telephone system. A base station apparatus (hereinafter referred to as "cell station (CS)" also) communicates with a terminal apparatus by allocating time slots, which constitute the unit of communication, to the terminal apparatus (hereinafter referred to as "personal station (PS)" also). Where the number of divided groups is eight, the conventional LCCH is constituted by a broadcast channel (hereinafter referred to as "BCCH"), eight paging channels (hereinafter referred to as "PCH"), three signal control channels (hereinafter referred to as "SCCH"), which are twelve channels altogether. The base station apparatus intermittently transmits their respective channels at intervals of 20 frames (See Non-patent Document 1, for instance). Each frame is constituted by eight time slots.

[Non-patent Document 1] "PERSONAL HANDY PHONE SYSTEM (SECOND-GENERATION CORDLESS TELEPHONE SYSTEM) STANDARD" ARIB STANDARD RCR STD-28-1, 4.1 version, (First of two volumes).

DISCLOSURE OF THE INVENTION

Problems to be Solved by the Invention

In the mobile communication system as described above, the base station apparatus carries out orthogonal frequency division multiple access (OFDMA) to increase the channel capacity of the base station apparatus. When the terminal apparatus receives an incoming call or signal, the base station apparatus transmits the PCH by having the number, with which to identify the terminal apparatus that receives the incoming call or signal (hereinafter referred to as "terminal number"), contained in the PCH. Upon receipt of the PCH, the terminal apparatus verifies whether its own terminal number is contained in the received PCH or not. When its own terminal number is contained in the PCH, the terminal apparatus transmits a request for an initial ranging. The PCHs, the request signal for an initial ranging, the BCCH and the like, all of which are different from data, correspond to control information used to establish a communication link and are generically referred to as "control signal" or "control signals". The terminal apparatus receives control signals in order to establish a communication link with the base station apparatus.

On the other hand, to improve the mobility of a terminal apparatus, a handover is invoked when the communication quality degrades. As a result, the terminal apparatus shifts the communicating base station from a base station apparatus that has been communicating with the terminal apparatus (hereinafter referred to as "handover source base station apparatus") to a new base station apparatus (hereinafter referred to as "handover destination base station apparatus"). The handover should be started when the terminal apparatus moves from within a service area formed by the handover source base station apparatus to a region outside the service area. For that purpose, the timing at which the terminal apparatus moves out of the service area must be accurately detected to start the handover with the proper timing.

The present invention has been made in view of the foregoing circumstances, and a purpose thereof is to provide a technique that detects the timing at which a terminal apparatus moves out of the service area formed by the handover source base station apparatus.

Means for Solving the Problems

In order to resolve the above problems, a radio apparatus according to one embodiment of the present invention comprises: a notification unit configured to convey a transmit timing of a signal to a target radio apparatus; a receiver configured to receive the signal transmitted from the target radio apparatus with a neighborhood of the transmit timing conveyed from said notification unit; a derivation unit configured to derive a difference between a first receive timing in the receiver and a second receive timing estimated based on the transmit timing in the notification unit; and a determining unit configured to determine a new transmit timing for the target radio apparatus, based on the difference derived by the derivation unit and configured to output the new transmit timing determined thereby to the notification unit. When a state in which the first receive timing lags the second receive timing occurs more than a predetermined frequency, the determining unit instructs the target radio apparatus to start a handover.

Another embodiment of the present invention relates to a communication method. The method comprises: conveying a transmit timing of a signal to a target radio apparatus; receiving the signal transmitted from the target radio apparatus with a neighborhood of the transmit timing conveyed; deriving a difference between a first receive timing of the received signal and a second timing estimated based on the transmit timing; and determine a new transmit timing for the target radio apparatus, based on the derived difference. When a state in which the first receive timing lags the second receive timing occurs more than a predetermined frequency, the determining instructs the target radio apparatus to start a handover.

Optional combinations of the aforementioned constituting elements, and implementations of the invention in the form of methods, apparatuses, systems, recording mediums, computer programs and so forth may also be effective as additional modes of the present invention.

Effect of the Invention

The present invention detects the timing at which a terminal apparatus moves out of the service area formed by a handover source base station apparatus.

BRIEF DESCRIPTION OF THE DRAWINGS

FIG. 4 shows a structure of a subchannel block in the communication system of FIG. 1.

FIGS. 9A and 9B are timing charts of a stepwise initial ranging performed by the base station apparatus of FIG. 6.

DESCRIPTION OF THE REFERENCE NUMERALS

Figure 1:
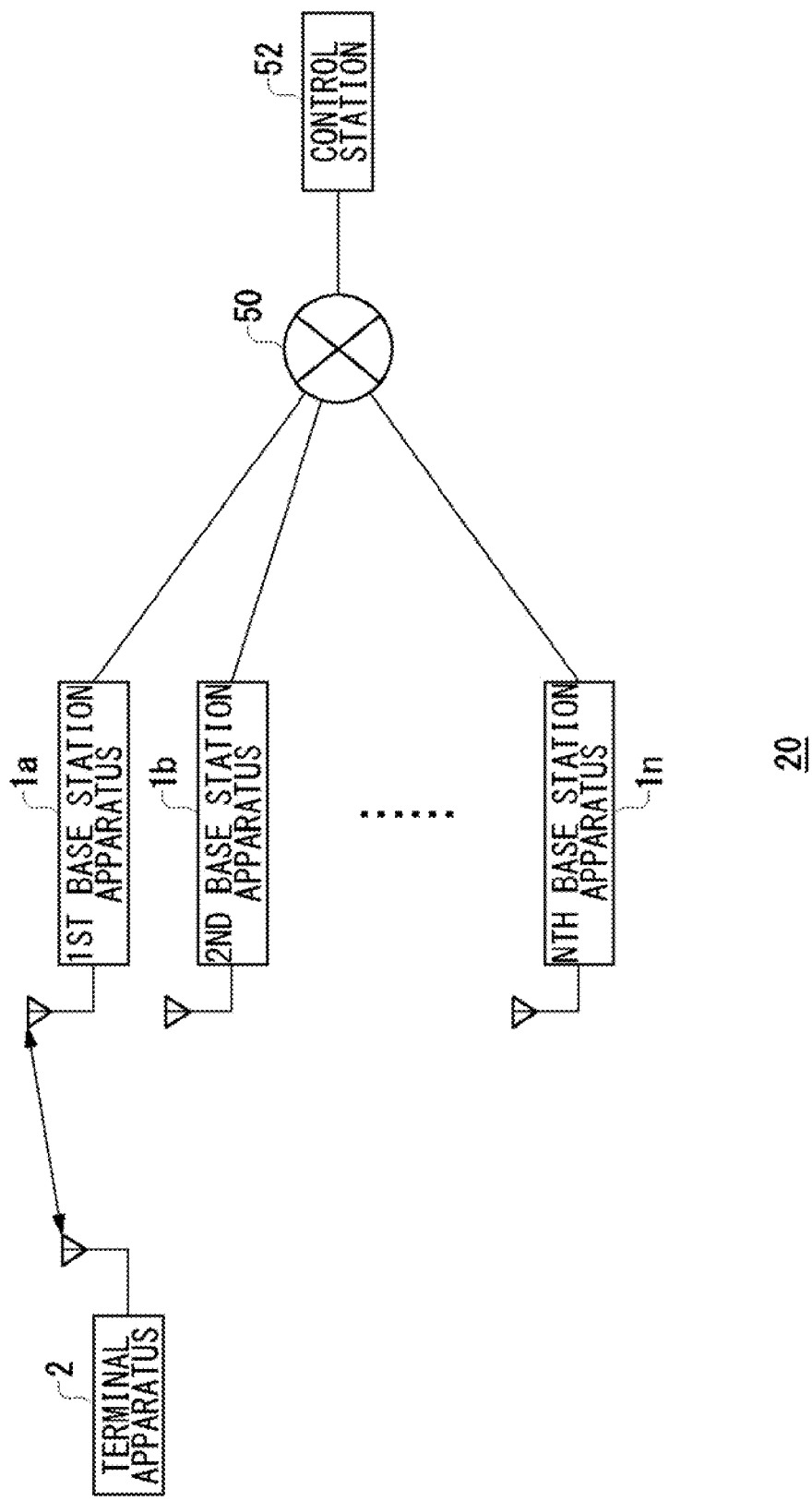
FIG. 1 shows a structure of a communication system according to an exemplary embodiment of the present invention.

1 Base station apparatus
2 Terminal apparatus
20 Communication system
50 Network
52 Control station
100 Antenna
101 Radio unit
102 Transmitter
103 Modulation unit
104 Receiver
105 Demodulation unit
106 IF unit
107 Control unit
110 Ranging processing unit
112 Allocation unit
120 Notification unit
122 Reception unit
126 Measurement unit
128 Determining unit

BEST MODE FOR CARRYING OUT THE INVENTION

An outline of the present invention will be given before a specific description thereof. The exemplary embodiments of the invention relate to a communication system comprised of a control station, base station apparatuses, and a terminal apparatus. In the communication system, each frame is formed such that a plurality of time slots are time-division multiplexed. And each time slot is formed such that a plurality of subchannels are frequency-division multiplexed. Each subchannel is formed by a multicarrier signal. Here, the OFDM signal is used as the multicarrier signal, and the OFDMA scheme is used as a frequency division multiplexing. In what is to follow, a channel identified by subchannels or time slots will be called a "subchannel block" or "burst", whereas a signal assigned to a "subchannel block" or "burst" will be called a "burst signal". A subchannel to which a control signal is assigned (this subchannel will be hereinafter referred to as "control channel"), and a subchannel to which a data signal is assigned are defined separately from each other. For example, a control channel is assigned to a subchannel of the lowest frequency in a frequency band defined in the communication system.

In a control channel, control signals for a plurality of base station apparatuses are time-division multiplexed. To find a handover destination base station apparatus, the terminal apparatus searches for a control channel so as to receive a control signal sent from a base station apparatus located nearby. For example, the terminal apparatus selects a base station apparatus corresponding to a control signal having a satisfactory receiving quality, as the handover destination base station apparatus. At this time, if the terminal apparatus is communicating with a handover source base station apparatus, the handover processing for the terminal apparatus will be started by any one of the terminal apparatus itself, the handover source base station apparatus and the control station. Assume herein that the handover processing is started by the handover source base station apparatus, and a description will be given accordingly. It is required of the handover source base station apparatus that the start timing be accurately and easily derived. To accurately and easily derive the start timing, the base station apparatus according to the present exemplary embodiment performs the following processing.

Since a base station apparatus connects to a plurality of terminal apparatuses using the OFDMA scheme, the timing alignment is performed on an uplink subchannel block. This is because, in the OFDMA scheme, the frequency and the timing of signal transmitted from a terminal apparatus are required to be synchronous with those of the base station apparatus. More specifically, based on a burst signal received from the terminal apparatus, the base station apparatus derives a difference between the timing at which the receiving of the burst signal is desired (hereinafter referred to as "desired timing") and the timing at which the burst signal is actually received (hereinafter referred to as "receive timing"). The base station apparatus adjusts the transmit timing in the next frame for the terminal apparatus so that the derived error can be small. For example, when the receive timing lags the desired timing, the base station apparatus adjusts the transmit timing so that the transmit timing is advanced. Further, the base station apparatus conveys the transmit timing to the terminal apparatus. At this time, if, over a plurality of frames, the situation continues where the receive timing lags the desired timing, the base station apparatus will recognize that the terminal apparatus is moving away from the base station apparatus. Thus, if the situation continues where the receive timing lags the desired timing, the base station apparatus will instruct the terminal apparatus to start a handover.

FIG. 1 shows a structure of a communication system 20 according to an exemplary embodiment of the present invention. The communication system 20 includes a first base station apparatus 1a, a second base station apparatus 1b, ..., and an Nth base station apparatus 1n, which are generically referred to as "base station apparatus 1" or "base station apparatuses 1", a terminal apparatus 2, a network 50, and a control station 52.

The terminal apparatus 2 is a radio equipment compatible with a predetermined wireless communication scheme. For example, OFDMA is assumed as the radio scheme. In OFDMA, a plurality of subchannels are multiplexed on the frequency axis, and each subchannel is constituted by OFDM signals. Here, the terminal apparatus 2 has not only call functions but also data communication functions. Data communication functions include, for instance, transmission and reception of electronic mail and browsing the World Wide Web (WWW). And these processings may be executed by the terminal apparatus 2 alone or in connection with a not-shown PC.

The base station apparatus 1 is connected at one end thereof to the terminal apparatus 2 in wireless communication and at the other end thereof to the network 50 in wired communication. The base station apparatus 1 is also connected to the control station 52 via the network 50. For example, the first base station apparatus 1a corresponds to the handover source base station apparatus, whereas the second base station apparatus 1b corresponds to the handover destination base station apparatus. As described above, the base station apparatus 1 defines a plurality of subchannels and a plurality of time slots, and assigns the combination thereof to the terminal apparatus 2 as a burst or subchannel block. Also, the base station apparatus 1 assigns a downlink burst and an uplink burst to the terminal apparatus 2 as a combination.

For example, the terminal apparatus 2 requests the base station apparatus 1 to allocate a burst. After the base station apparatus 1 allocates the burst to the terminal apparatus 2, the base station apparatus 1 conveys the result to the terminal apparatus 2. Since the OFDMA scheme is employed in this case, a ranging process may be carried out between the terminal apparatus 2 and the base station apparatus 1 before and after the request for the allocation of the burst is made. Any known technique may be used as the ranging process and therefore the description thereof is omitted here. Even after the ranging process has been completed, the terminal apparatus 2 performs a control in such a manner as to synchronize with the operation timing of the base station apparatus 1 and the frequency of carrier waves. More specifically, upon receipt of a signal sent from the terminal apparatus 2, the base station apparatus 1 detects a frequency offset and a timing difference contained in the signal and then instructs the terminal apparatus 2 to correct the frequency offset and the displacement of timing.

If the timing difference for the terminal apparatus 2 meets a predetermined condition, the first base station apparatus 1a will instruct the terminal apparatus 2 to start the handover. The terminal apparatus 2 monitors the control channel so as to identify the second base station apparatus 1b as the handover destination base station apparatus. The terminal apparatus 2 and the first base station apparatus 1a cut off communication with each other, and the terminal apparatus 2 requests a connection to the second base station apparatus 1b. Then the terminal apparatus 2 and the second base station apparatus 1b start communicating with each other.

The control station 52 connects to the base station apparatuses 1 via the network 50. The control station 52 executes position registration for the terminal apparatus 2 via a base station apparatus 1. The position registration is to keep track of and manage the positions of the terminal apparatus 2 as to which particular paging area contains the terminal apparatus 2. A known technique may be used for the position registration and therefore the description thereof is omitted here. The control station 52 receives an incoming signal notification for the terminal apparatus 2, from a not-shown switching equipment or the like. Based on the result of the position registration, the control station 52 identifies which particular paging area contains the terminal apparatus 2 corresponding to the incoming signal notification. Further, the control station 52 transmits the incoming signal notification to a base station apparatus 1 belonging to the paging area. The network 50 is connected to not only the control station 52 but also the base station apparatuses 1. For example, the network 50 may be an IP (Internet Protocol) network, but is not limited thereto. The network 50 transmits data received from a not-shown communication apparatus, to the base station apparatuses 1 and, at the same time, transmits data received from the base station apparatuses 1, to the communication apparatus.

Figure 2:
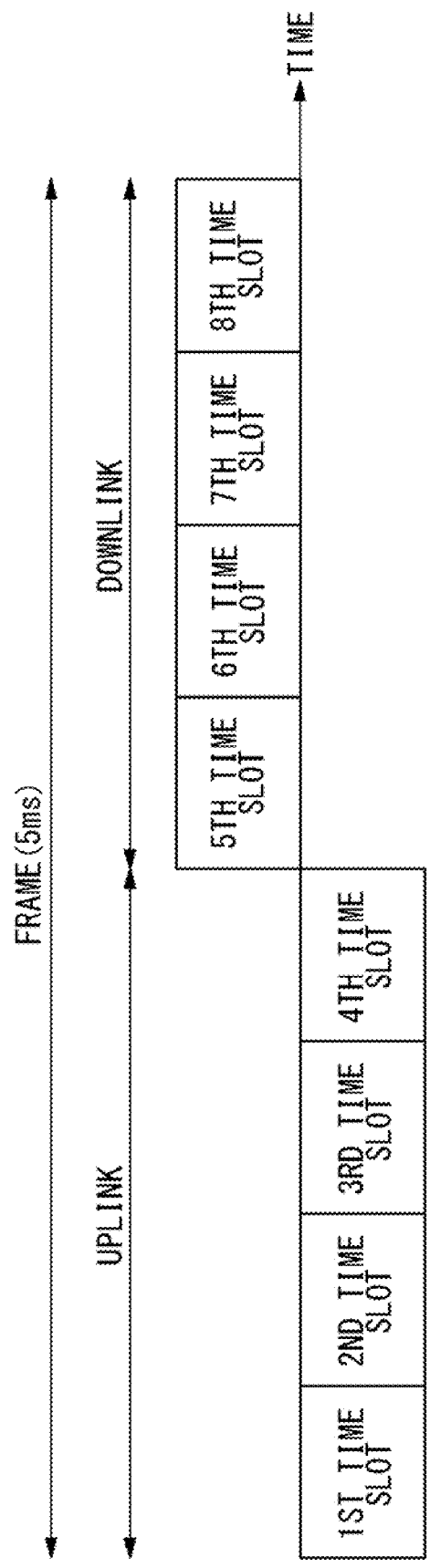
FIG. 2 shows a structure of a TDMA frame in the communication system of FIG. 1.

FIG. 2 shows a structure of a TDMA frame in the communication system 20. Similar to the second-generation cordless telephone system, in the communication system 20 a frame is constituted by four time slots allocated to an uplink communication and another four time slots to a downlink communication. Frames are arranged contiguously. Since the uplink communication and the downlink communication are symmetrical to each other in the present exemplary embodiment, a description will be hereinbelow given of the downlink communication only, for convenience of explanation.

Figure 3:
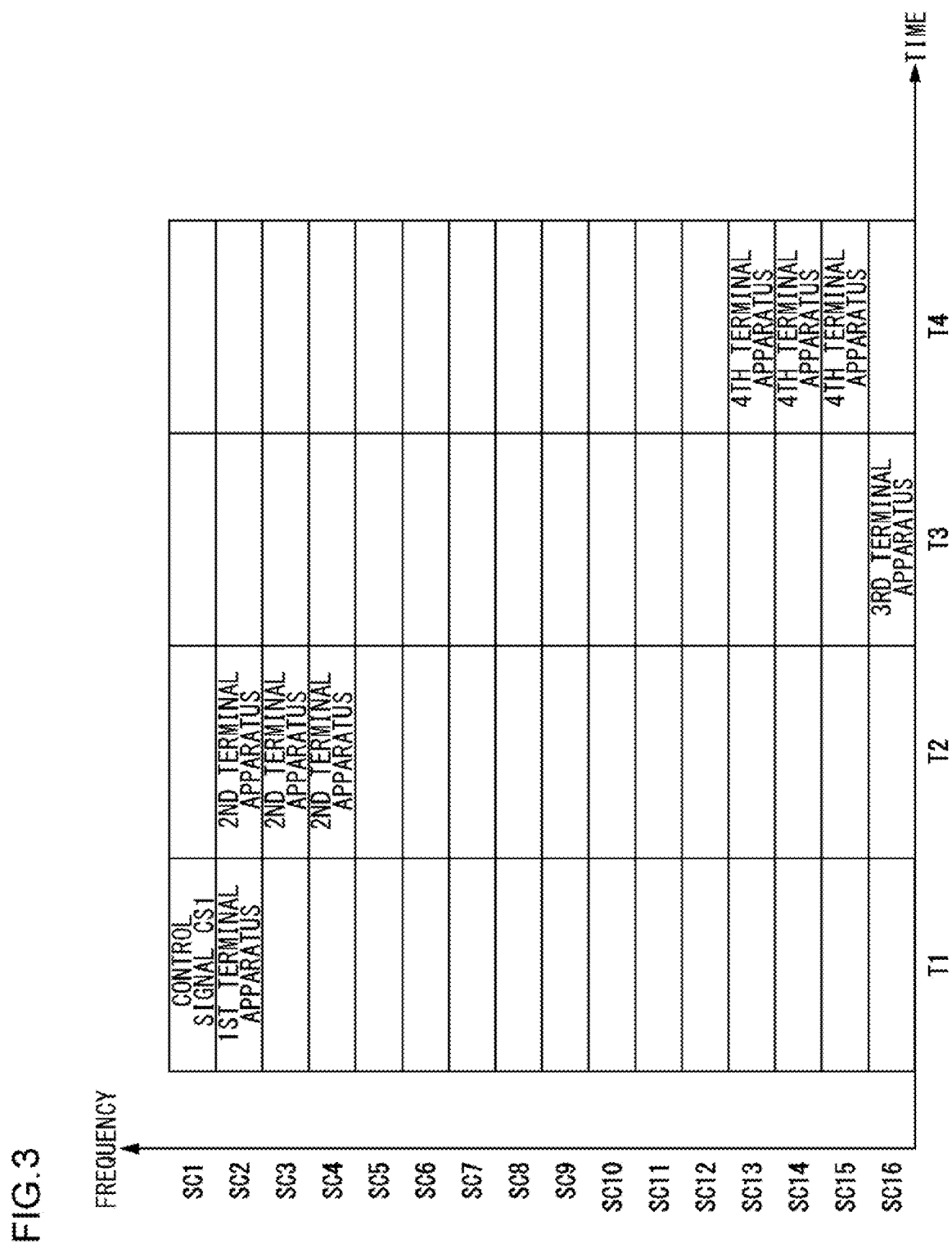
FIG. 3 shows a structure of an OFDMA subchannel in the communication system of FIG. 1.

FIG. 3 shows a structure of an OFDMA subchannel in the communication system 20. The base station apparatus 1 further uses OFDMA as shown in FIG. 3, in addition to the above-described TDMA. As a result, a plurality of terminal apparatuses are assigned to a single time slot. In FIG. 3, the arrangement of time slots on the time axis is indicated in the horizontal axis direction whereas the arrangement of subchannels on the frequency axis is indicated in the vertical axis direction. That is, the multiplexing of the horizontal axis corresponds to TDMA whereas the multiplexing of the vertical axis corresponds to OFDMA. Here, each frame contains a first time slot (denoted by "T1" in FIG. 3) to a fourth time slot (denoted by "T4" in FIG. 3). For example, T1 to T4 in FIG. 3 corresponds to the fifth time slot to the eighth time slot of FIG. 2, respectively.

Each time slot contains a first subchannel (denoted by "SC1" in FIG. 3) to a sixteenth subchannel (denoted by "SC16" in FIG. 3). In FIG. 3, the first subchannel is secured and assigned as the control channel. In FIG. 3, the first base station apparatus 1a (denoted by "CS1" in FIG. 3) assigns the control channel to the first subchannel of the first time slot. That is, the frame structure and a set of a plurality of frames with SC1 only being focused are equivalent to LCCH. In FIG. 3, the first terminal apparatus 2a is assigned to the second subchannel of the first time slot, and the second terminal apparatus 2b is assigned to the second to fourth subchannels of the second time slot. Also, the third terminal apparatus 2c is assigned to the sixteenth subchannel of the third time slot, and the fourth terminal apparatus 2d is assigned to the thirteenth to fifteenth subchannels.

FIG. 4 shows a structure of a subchannel block in the communication system 20. As described above, a subchannel block corresponds to a burst. In FIG. 4, the horizontal direction represents the time axis, whereas the vertical direction represents the frequency axis. The numbers "1" to "29" indicate subcarrier numbers. In this manner, a subchannel is constituted by multicarrier signal in OFDM. "TS" in FIG. 4 corresponds to a training symbol, and contains known signals, such as a not-shown symbol "STS" used for the detection of the synchronous timing and a not-shown symbol "LTS" used for the estimation of channel characteristics. "GS" corresponds to a guard symbol, and no substantial signal is assigned to "GS". "PS" corresponds to a pilot symbol, and is constituted by known signals. "SS" corresponds to a signal symbol, and a signal for use in control is assigned here. "DS" corresponds to a data symbol, and is data to be transmitted. "GT" corresponds to a guard time, and no substantial signal is assigned here.

Figure 5:
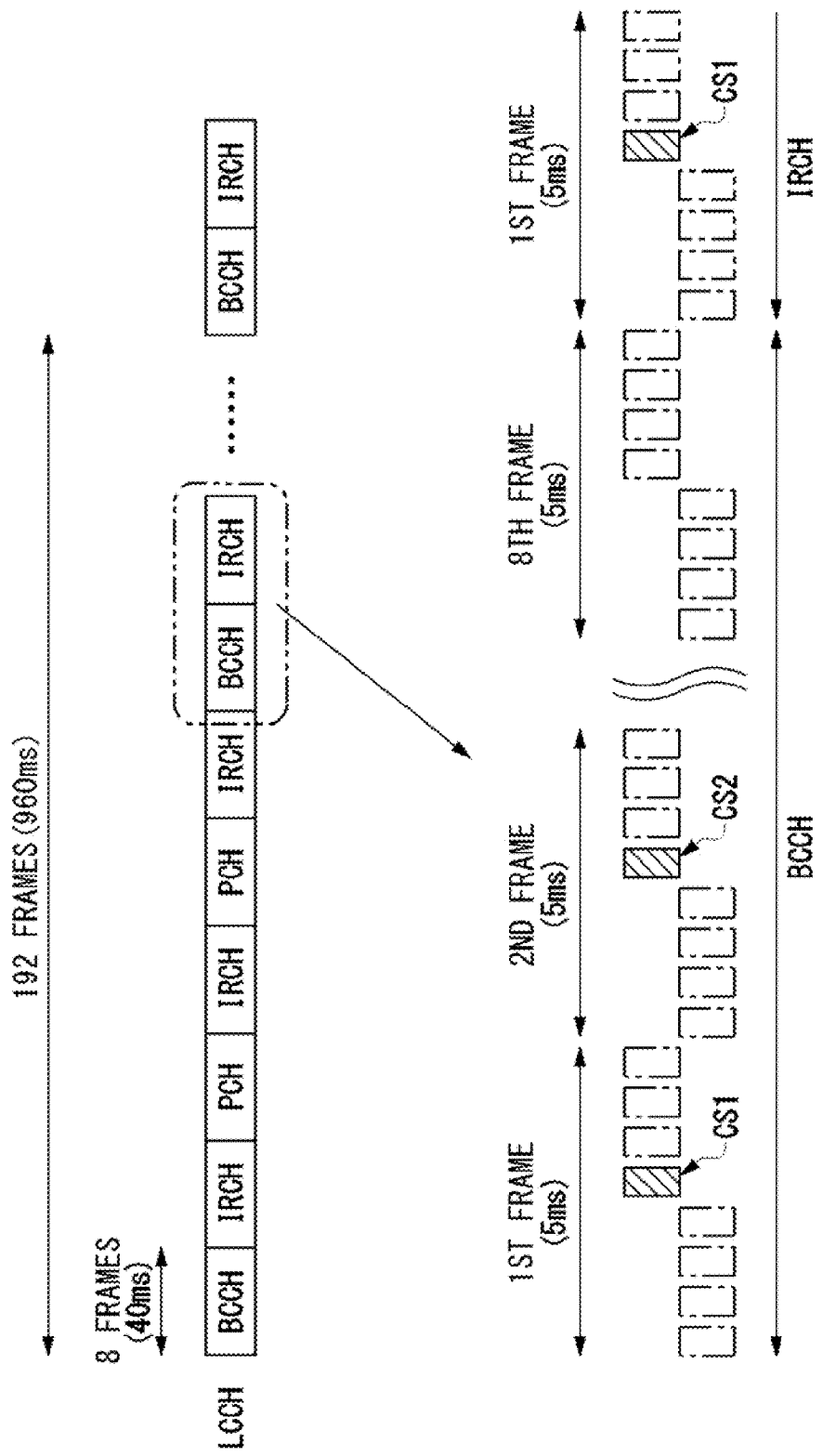
FIG. 5 shows a structure of a logical control channel in the communication system of FIG. 1.

FIG. 5 shows a structure of a logical control channel in the communication system 20. The logical control channel is composed of twenty four channels, which are four BCCHs, twelve IRCHs and eight PCHs. BCCH, IRCH and PCH are each constituted by eight TDMA frames (hereinafter simply referred to as "frames"). Each frame is constituted as shown in FIG. 2. In FIG. 5, frames to which PCH, BCCH and IRCH are assigned are indicated as "PCH", "BCCH" and "IRCH", respectively, for the sake of simplicity. Though, as described above, each frame is divided into a plurality of time slots, hereinafter the unit of time slots, the unit of frames and the unit of eight frames are not distinguished from their respective units and the terms "PCH", "BCCH" and "IRCH" are used.

In FIG. 5, "IRCH" is a channel used for initial ranging at the time of channel allocation. More specifically, "IRCH" contains "TCCH" and "IRCH" wherein "TCCH" corresponds to the request for initial ranging transmitted from the terminal apparatus 2 to the base station apparatus 1. Also, "IRCH" corresponds to a response to the request for initial ranging. Accordingly, "TCCH" is an uplink signal, and "IRCH" is a downlink signal. It is to be noted that hereinafter a combination of TCCH and IRCH is also called IRCH and used as such with no distinction from the case where IRCH is singly used. A base station, which has received TCCH from the terminal apparatus, executes a ranging process. Since any known technique may be used for the ranging process, a description thereof is omitted here.

The structure of each frame is shown in a lower part of FIG. 5 and is illustrated in the same way as FIG. 2. This corresponds to the frame construction of SC1 as shown in FIG. 3. Out of the time slots constituting a frame, the first base station apparatus 1a shown in FIG. 1 intermittently transmits BCCH, IRCH and PCH, at intervals of eight frames, in time slots to which LCCH is assigned (indicated by "CS1" in FIG. 5). That is, the first base station apparatus 1a uses the fifth time slot in the first frame of eight frames that constitute BCCH, and uses the fifth time slot in the first frame of eight frames that constitute IRCH.

Further, the first base station apparatus 1a uses the fifth time slot in the first frame of eight frames that constitute PCH. Out of time slots of a frame next to the frame transmitted by the first base station apparatus 1a (this frame is indicated as the "second frame" in FIG. 5), the second base station apparatus 1b shown in FIG. 1 transmits intermittently BCCH, IRCH and PCH at intervals of eight frames, in a time slot whose position from the head frame is the same as with the time slot used by the first base station apparatus 1a (this frame is indicated as "CS2" in FIG. 5). With such a frame structure as the one described above, eight base station apparatuses or up to thirty-two base station apparatuses at maximum can be multiplexed for every four downlink time slots constituting a frame.

Figure 6:
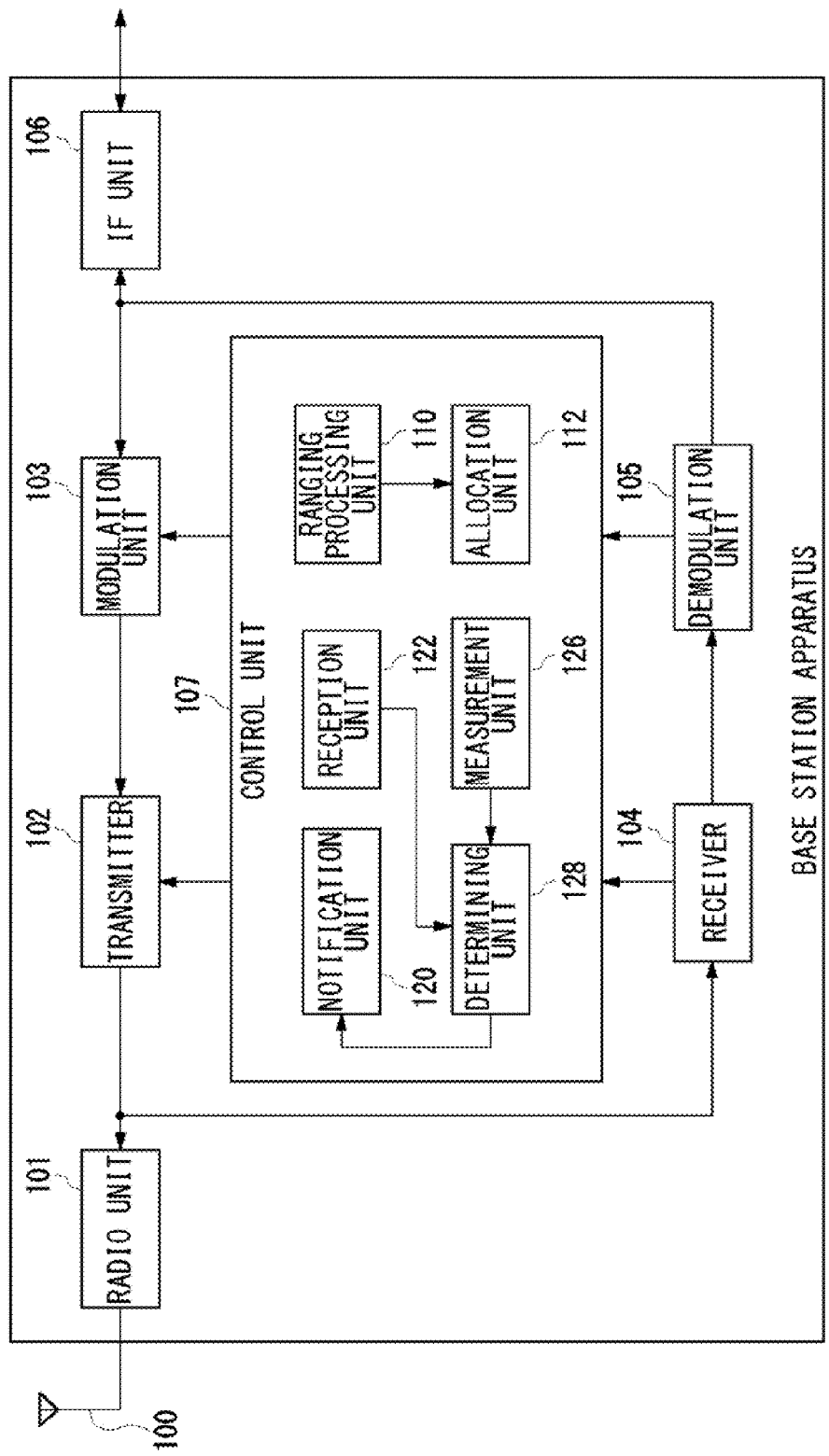
FIG. 6 shows a structure of a base station apparatus shown in FIG. 1.

FIG. 6 shows a structure of the base station apparatus 1. The base station apparatus 1 includes an antenna 100, a radio unit 101, a transmitter 102, a modulation unit 103, a receiver 104, a demodulation unit 105, an IF unit 106, and a control unit 107. The control unit 107 includes a ranging processing unit 110, an allocation unit 112, a notification unit 120, a reception unit 122, a measurement unit 126, and a determining unit 128.

The antenna 100 receives and transmits radiofrequency signals. Here, the radiofrequency signals correspond to those shown in FIG. 2 to FIG. 4. As a receiving processing, the radio unit 101 performs frequency conversion and quadrature detection on radiofrequency signals received by the antenna 100 so as to produce baseband signals. Further, the radio unit 101 outputs the baseband signal to the receiver 104. The baseband signal, which is composed of in-phase components and quadrature components, shall generally be transmitted by two signal lines. For the clarity of Figures, the baseband signal is presented here by a single signal line only. An AGC unit is also included in the radio unit 101.

As a transmission processing, the radio unit 101 performs quadrature modulation and frequency conversion on the baseband signals transmitted from the transmitter 102 and thereby produces radiofrequency signals. Further, the radio unit 101 outputs the radiofrequency signals to the antenna 100. While using the same radiofrequency band as that of the received signal, the radio unit 101 transmits the signal. That is, assume that TDD is in use as shown in FIG. 2A. A PA (Power Amplifier) is also included in the radio unit 101.

The transmitter 102 converts the frequency-domain signals fed from the modulation unit 103, into the time-domain signals and then outputs the converted signals to the radio unit 101. The frequency-domain signals are converted into the time-domain signals through IFFT (Inverse Fast Fourier Transform). The modulation unit 103 modulates an input received from the IF unit 106 and then outputs the modulated result to the transmitter 102. BPSK (Binary Phase Shift Keying), QPSK (Quadrature Phase Shift Keying), 16-QAM (Quadrature Amplitude Modulation), 64-QAM, 256-QAM or the like is used as the modulation scheme. The modulation unit 103 receives instructions on a downlink burst, from the control unit 107 and then allocates the modulated data to the burst. As a result, a multicarrier signal in the frequency domain, particularly an OFDM signal, is produced. Note that the OFDM signal may contain a plurality of subchannels.

The receiver 104 converts the time-domain signals fed from the radio unit 101 into the frequency-domain signals and then outputs the converted signals to the demodulation unit 105. The time-domain signals are converted into the frequency-domain signals through FFT (Fast Fourier Transform). The demodulation unit 105 demodulates an input received from the receiver 104 and then outputs the demodulated result to the IF unit 106. Assume herein that the demodulation is compatible with the modulation. In parallel with the above-described processing, the demodulation unit 105 detects a timing difference for the burst signal, based on the burst signal received from the terminal apparatus 2. Such a timing difference may also be said to be a displacement of timing in the terminal apparatus 2. The detection of a timing difference will be discussed later. The demodulation unit 105 outputs the detected timing difference to the control unit 107.

As a receiving processing, the IF unit 106, which is connected to the not-shown network 50, outputs the signals demodulated by the demodulation unit 105, to the not-shown network 50. As a transmission processing, IF unit 106 receives the input of data from the network 50, and outputs the received data to the modulation unit 103. The IF unit 106 receives the incoming signal notification from the not-shown control station 52, via the not-shown network 50. For example, the IF unit 106 outputs the received incoming signal notification to the control unit 107.

The control unit 107 controls the timing of the base station apparatus 1 as a whole. The control unit 107 generates LCCH as shown in FIG. 5 and transmits the thus generated LCCH intermittently to the terminal apparatus 2. The control unit 107 controls the timing with which LCCH, such as BCCH, is transmitted sequentially from the modulation unit 103, the transmitter 102, the radio unit 101 and the antenna 100. The control unit 107 periodically assigns LCCH, which is a control signal, to a predefined subchannel, namely a control channel. That is, the control unit 107 periodically selects time slots from among a plurality of time slots which have been time-division multiplexed, and assigns LCCH to the thus selected time slots. Here, the control unit 107 uses BCCH, IRCH, PCH, IRCH, PCH, and IRCH in this order as LCCH. The control unit 107 has the modulation unit 103, the transmitter 102 and the radio unit 101 broadcast the assigned LCCH.

Figure 7:
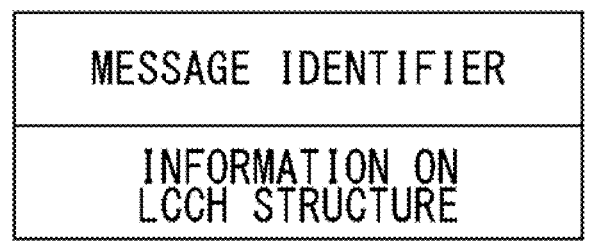
FIG. 7 shows a message format of BCCH transmitted from the base station apparatus of FIG. 6.
Figure 8:
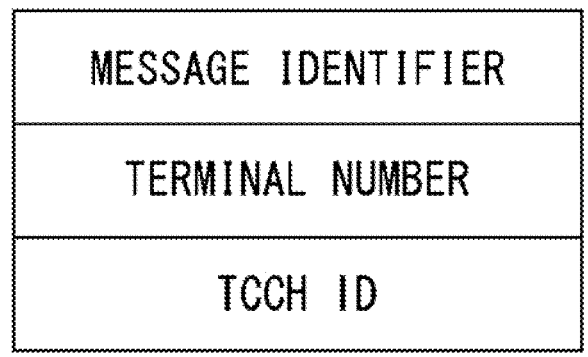
FIG. 8 shows a message format of PCH transmitted from the base station apparatus of FIG. 6.

Based on the incoming signal notification received by the IF unit 106, the ranging processing unit 110 generates PCH as an incoming call signal. The ranging processing unit 110 broadcasts PCH via the modulation unit 103, the transmitter 102, the radio unit 101 and the antenna 100. FIG. 7 shows a message format of BCCH transmitted from the base station apparatus 1. BCCH contains a message identifier by which to determine the message type, and a parameter that prescribes a logical control channel. Here, the parameter prescribing a logical control channel may be LCCH-structure information representing an interval value, group division, a maximum value of battery saving cycle, and the like. FIG. 8 shows a message format of PCH transmitted from the base station apparatus 1. PCH contains a message identifier by which to determine the message type and the number assigned to a terminal apparatus that has received the incoming call signal. Also, PCH includes TCCH ID. Upon receipt of a notification indicating that there has been an incoming call signal through PCH, the terminal apparatus 2 requests a base station apparatus 1, which has transmitted said PCH, to perform initial ranging. Now refer back to FIG. 6.

As the ranging processing unit 110 receives TCCH sent from the terminal apparatus 2, the ranging processing unit 110 adjusts the transmitted power and the transmit timing of the terminal apparatus 2 by the use of a known technique. Also, the ranging processing unit 110 repeats, more than once, to perform a ranging process of transmitting a ranging response, such as IRCH, which contains a result of the adjustment. A detailed description is given of such a process in conjunction with FIGS. 9A and 9B. FIGS. 9A and 9B are timing charts of a stepwise initial ranging performed by the base station apparatus 1. For convenience of explanation, numbers are sequentially assigned to frames starting a leading one, and Frame 1 through Frame 9 are indicated by "F1" through "F9", respectively. For the clarity of Figure, only the first time slots for the uplink and the downlink, respectively, are shown in FIGS. 9A and 9B.

The ranging processing unit 110 specifies the timing with which to receive the initial TCCH and the timing with which to transmit IRCH in SC1 of FIG. 3. FIG. 9A shows an operation in SC1. The terminal apparatus 2 receives not-shown BCCH and thereby identifies a base station apparatus 1 to which the terminal apparatus 2 is to connect. The terminal apparatus 2 transmits TCCH using F1. Note that the terminal apparatus 2 may receive PCH. In such a case, the terminal apparatus 2 receives BCCH after having received PCH.

FOR TCCH, a plurality of kinds of TCCHs are defined as waveform patterns. In other words, a waveform pattern is defined by selecting some from among a plurality of subcarriers, and a plurality of kinds of waveform patterns are defined by varying the selected subcarriers. Accordingly, even if TCCHs are simultaneously received from a plurality of terminal apparatuses 2, the ranging processing unit 110 can recognize the plurality of terminal apparatuses 2 as long as the waveform patters differ among them. That is, the collision probability of TCCHs is reduced. Here, the not-shown terminal apparatus 2 randomly selects any one from among the waveform patterns that come in a plurality of kinds.

Figure 10:
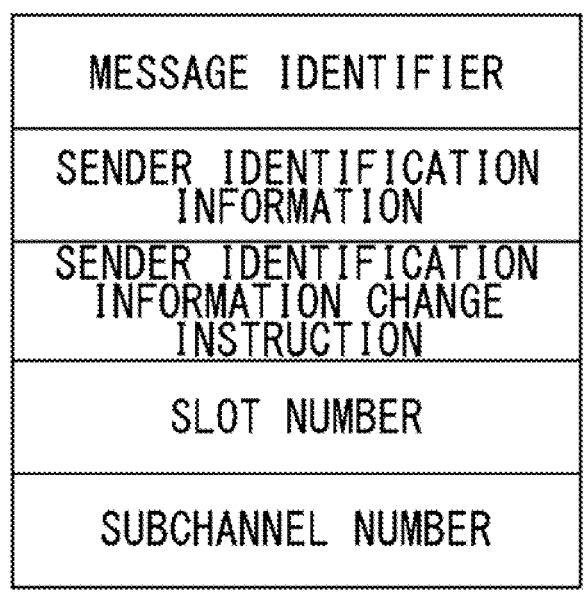
FIG. 10 shows a message format of IRCH transmitted from the base station apparatus of FIG. 6.

FIG. 10 shows a message format of IRCH transmitted from the base station apparatus 1. IRCH contains the following four components. That is, the four components are a message identifier used to determine the type of message, information used to identify a source that has requested the initial ranging, a source identification information modifying instruction by which it is instructed to change the identification information of a source to a value different from that at the time of the first initial ranging request, information by which to specify a data transfer channel used to transmit the second TCCH (this channel will be hereinafter referred to as "TCH"). Here, TCH is assigned to a subchannel other than SC1 of FIG. 3. Though a communication channel used for communication is later denoted by TCH as well, there will be used without being distinguished from each other. When the initial ranging is simultaneously requested from a plurality of terminal apparatuses 2, the base station apparatus 1 performs a predetermined arithmetic operation on the source identifying information. In other words, the source identifying information is a prescribed value such that the plurality of terminal apparatuses 2 simultaneously requesting the initial ranging can be identified. Now refer back to FIG. 9B.

The ranging processing unit 110 defines the timing, with which TCCH sent from the terminal apparatus 2 is to be received from the second time on, by the previous ranging response, which is IRCH, for instance. Also, the ranging processing unit 110 defines the timing with which TCCH is to be received from the second time on and the timing with which the ranging response is to be transmitted from the second time on, in a frequency band in which TCH is adaptively assigned to each base station apparatus 1 in SC3 to SC16 of FIG. 3, for instance. FIG. 9B corresponds to a timing chart in a subchannel specified by IRCH, and the ranging processing unit 110 receives TCCH in F3 and transmits RCH as the ranging response.

Figure 11:
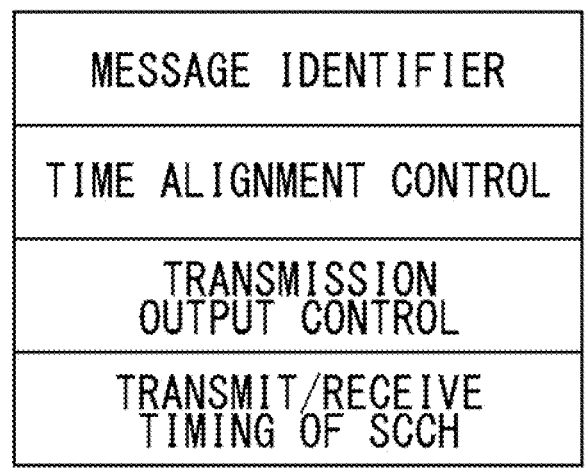
FIG. 11 shows a message format of RCH transmitted from the base station apparatus of FIG. 6.

FIG. 11 shows a message format of RCH transmitted from the base station apparatus 1. RCH contains a message identifier by which to determine the message type, control information used to synchronize the timings, and a transmit timing of SCCH indicating a start timing of a request for radio resource allocation. Here, the control information includes information on timing alignment control and information on a transmit output control. The terminal apparatus 2 corrects the time lag by the timing alignment control and corrects the transmitted power by the transmit output control so as to establish the synchronization between the terminal apparatus 2 and the base station apparatus 1. Then the terminal apparatus 2 requests the radio resource allocation. Now refer back to FIG. 9B.

Suppose, as shown in FIG. 9B, that RCH is specified in F5 and SCCH is specified in F6. When the allocation unit 112 of FIG. 6 receives SCCH from the not-shown terminal apparatus 2 after the ranging process in the ranging processing unit 110 has been terminated, the allocation unit 112 assigns a communication channel TCH to this terminal apparatus 2. The allocation unit 112 transmits the allocation result in F5 of FIG. 9b by having the allocation result contained in SCCH. In this manner, the allocation unit 112 allocates a channel to the terminal apparatus 2 that has transmitted IRCH, in a frequency band different from that to which BCCH, PC and the like are assigned by the ranging processing unit 110.

Figure 12:
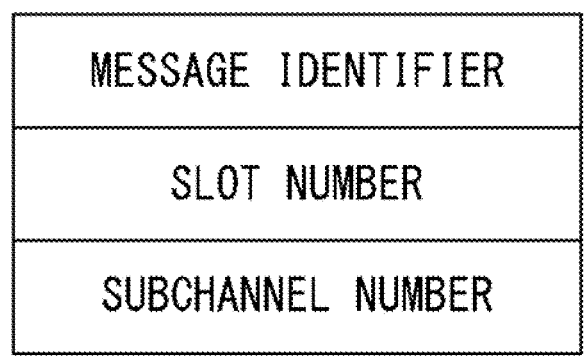
FIG. 12 shows a message format of SCCH transmitted from the base station apparatus of FIG. 6.

FIG. 12 shows a message format of SCCH transmitted from the base station apparatus 1. SCCH contains a message identifier by which to determine the message type, and information used to specify TCH assigned to the terminal apparatus 2, namely the slot number and the subchannel number. In this manner, the initial ranging request is processed in stages; LCCH is used for transmitting a response up to the first initial ranging request, and TCH is used for transmitting a response, which follows it, to the second initial ranging request and radio resource allocation request. As a result, channels can be allocated to a plurality of terminal apparatuses at a time. Thus, the terminal apparatuses can be accurately separated from one another without the trouble of preparing for many pieces of source identifying information in advance. Now refer back to FIG. 9B. As shown in FIG. 9B, assume that TCH from F8 and onward is specified in SCCH. After TCH has been allocated by the allocation unit 112, the radio unit 101, the transmitter 102, the modulation unit 103, the receiver 104, the demodulation unit 105 and the IF unit 106 communicate with the terminal apparatus 2.

While in communication with the terminal apparatus 2, the notification unit 120 conveys the transmit timing of a burst signal to the terminal apparatus 2 via the modulation unit 103, the transmitter 102 and the radio unit 101. That is, the notification unit 120 conveys the result of timing alignment to the terminal apparatus 2. The notification unit 120 receives information on the transmit timing, from the determining unit 128 described later. After the transmit timing has been conveyed, the demodulation unit 105 receives the burst signal sent from the terminal apparatus 2, with timing close to that conveyed from the notification unit 120. As described above, the demodulation unit 105 measures the amount of timing difference relative to the received burst signal.

The amount of timing difference is equivalent to the difference between the receive timing of burst signal in the demodulation unit 105 and the receive timing predicted from the transmit timing in the notification unit 120 (hereinafter referred to as "predicted timing"). Since the determining unit 128 (discussed later) determines the transmit timing so that the burst signal from the terminal apparatus 2 can be contained within time slots, the predicted timing corresponds to the header timing of the time slots. Note that the predicted timing may be one shifted posterior to the header timing of the time slots. The reception unit 122 receives the amount of timing difference from the demodulation unit 105. The reception unit 122 outputs the received amount of timing difference to the determining unit 28.

The determining unit 128 receives the amount of timing difference fed from the reception unit 122. The determining unit 128 determines new timing for the terminal apparatus 2 in response to the amount of timing difference and thereby updates the transmit timing. For example, where the amount of timing difference is "T", the determining unit 128 determines that the transmit timing be shifted by "−T" in the next frame. To maintain the stability of the communication system 20, a maximum value is set to the amount of shift in transmit timing. Also, the determining unit 128 outputs the new transmit timing determined thereby, to the notification unit 120. The notification unit 120 conveys the new transmit timing received from the determining unit 128, to the terminal apparatus 2.

The measurement unit 126 receives the received signal from the receiver 104 or the demodulation unit 105, and measures the strength of the received signal (hereinafter referred to as "received power"). Since a method for measuring the received power in the measurement unit 126 may be any known technique, the description thereof is omitted here. The measurement unit 126 outputs the received power to the determining unit 128. If a state in which the receive timing lags the predicted receive timing continues, the determining unit 128 counts the number of consecutive occurrences of the state. In a state where the receive timing lags the predicted receive timing, there is a possibility that the terminal apparatus 2 moves away from the base station apparatus 1.

If the distance between the base station apparatus 1 and the terminal apparatus 2 is denoted by L (m) and the speed of light is denoted by c (m/s), the propagation time of the uplink signal will be expressed by L/c (s). If the terminal apparatus 2 travels by ΔL, then the amount of receive timing difference ΔX will be expressed by the following Equation (1).

$$\Delta X = \Delta L/C \qquad \text{Eq. (1)}$$

The control interval of transmit timing is denoted by t (s) and the control unit of transmit timing is denoted by x (s). If an instruction is given such that the transmit timing is advanced by n steps for more than twice continuously, a relation expressed by the following Equation (2) will hold.

$$\Delta X = n \times X \qquad \text{Eq. (2)}$$

Accordingly, combining Eq. (1) with Eq. (2), a relation expressed by the following Equation (3) holds.

$$V = (n \times X \times c)/t \qquad \text{Eq. (3)}$$

The determining unit 128 defines beforehand a threshold value for the measured number of consecutive occurrences (hereinafter referred to as "timing threshold value"). The determining unit 128 compares the measured number of consecutive occurrences against the timing threshold value. If the number of consecutive occurrences is greater than the timing threshold value, the determining unit 128 will proceed to the next step. To execute the next step, the determining unit 128 defines beforehand a threshold value for the received power measured by the measurement unit 126 (hereinafter referred to as "power threshold value"). The determining unit 128 compares the measured received power against the power threshold value. If the received power is less than the power threshold value, the determining unit 128 will determine the start of a handover for the terminal apparatus 2.

That is, a state is assumed in which that the terminal apparatus 2 travels away from the base station apparatus 1, in the step of comparing the number of consecutive occurrences with the timing threshold value. At this stage, however, there is a possibility that even though the terminal apparatus 2 is located near the base station apparatus 1, the amount of initial timing difference is large and therefore the number of consecutive occurrences is large. At the same time, if the received power is compared with the power threshold value and then the possibility of the latter case is small, a situation where the terminal apparatus 2 travels away from the base station apparatus 1 will be identified. That is, if the aforementioned two conditions are met, the situation will be that at a speed of v the terminal apparatus 2 moves out of a cell formed by the base station apparatus 1. The determining unit 128 instructs the terminal apparatus 2 to execute the handover via the modulation unit 103, the transmitter 102 and the radio unit 101.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 13:
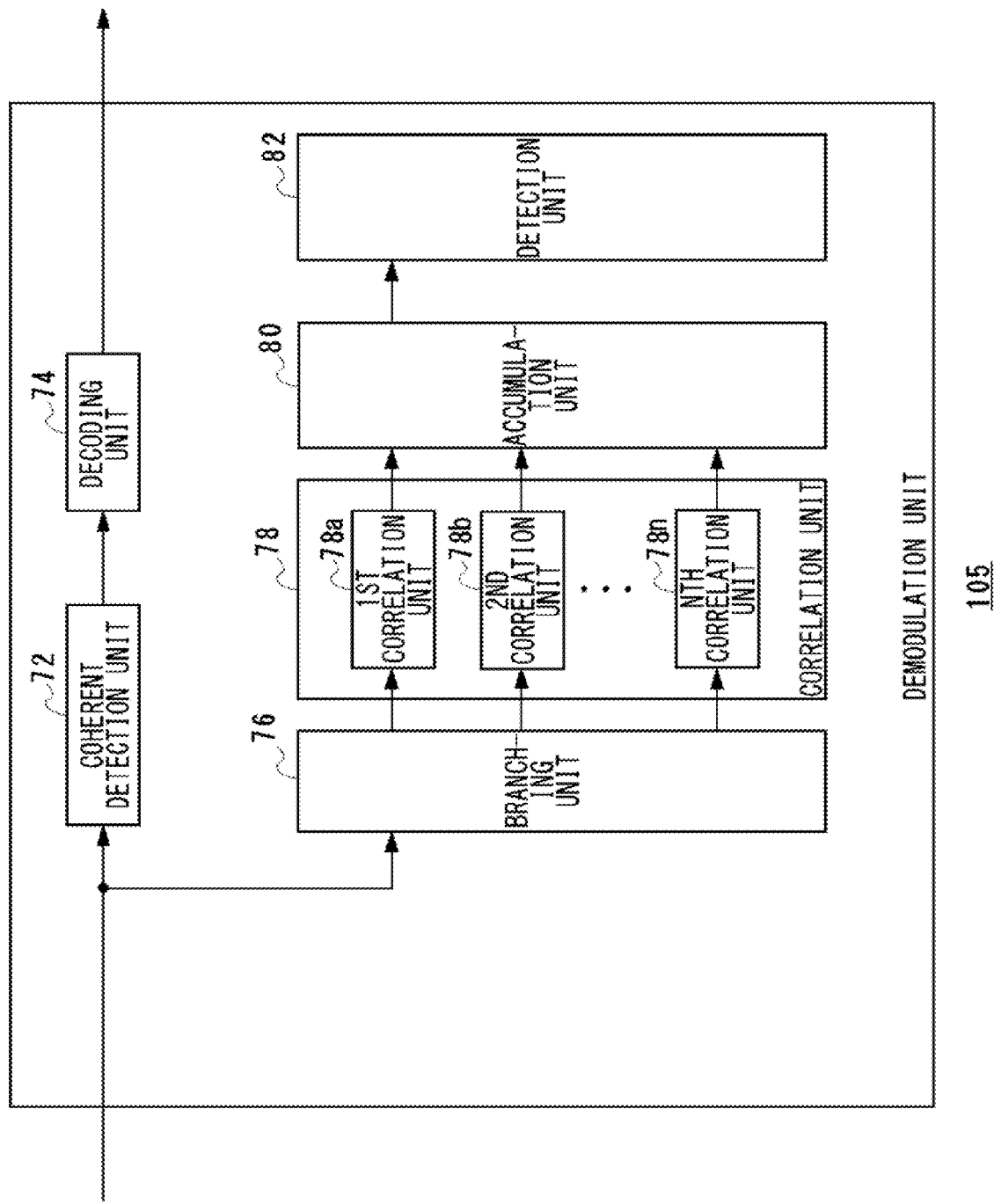
FIG. 13 shows a structure of a demodulation unit of FIG. 6.

FIG. 13 shows a structure of the demodulation unit 105. The demodulation unit 105 includes a coherent detection unit 72, a decoding unit 74, a branching unit 76, a first correlation unit 78a, a second correlation unit 78b, . . . , and an Nth correlation unit 78n, which are generically referred to as "correlation unit 78" or "correlation units 78", an accumulation unit 80, and a detection unit 82.

The coherent detection unit 72 receives frequency-domain OFDM signals from the not-shown receiver 104, and estimates the channel characteristics in a field "TS" on a subcarrier-by-subcarrier basis. Also, the coherent detection unit 72 demodulates the frequency-domain OFDM signals per subcarrier, based on the estimated channel characteristics. The coherent detection unit 72 outputs the demodulated signals to the decoding unit 74. The decoding unit 74 receives the demodulated signals from the coherent detection unit 72 and decodes the demodulated signals. Decoding corresponds to the coding executed by the not-shown terminal apparatus 2. If, for example, convolutional coding is carried out as the coding, the decoding unit 74 will execute Viterbi decoding. The decoding unit 74 outputs the decoded signals.

The branching unit 76 receives the frequency-domain OFDM signals from the not-shown receiver 104, and branches out the frequency-domain OFDM signals along a plurality of branch paths. The number of branches is determined according to the number of correlation units 78 described later. As described above, each frequency-domain OFDM signal is constituted by multiple subcarriers; the branching unit 76 branches out the OFDM signals into a plurality of groups of multiple subcarriers in such a manner that multiple carriers are gathered into one unity. The branching unit 76 outputs a plurality of branched-out OFDM signals in parallel. In other words, the contents of the plurality of OFDM signals are identical to each other.

A plurality of correlation units 78 are provided for OFDM signals, which are branched out into a plurality of them by the branching unit 76, respectively. The first correlation unit 78a stores beforehand the value of "TS" in units of subcarrier. At the same time, the second correlation unit 78b stores beforehand a value, which is obtained by rotating the value of "TS" by a predetermined phase, in units of subcarrier. For example, suppose that the value of "TS" for the kth subcarrier is determined by the values I(k) and Q(k). Then the values I'(k) and Q'(k) for the kth subcarrier stored in the second correlation unit 78b are expressed by the following Formula (1).

$$I'(k)=I(k)\cos(2\pi kC\Delta t)-Q(k)\sin(2\pi kC\Delta t)$$
$$Q'(k)=I(k)\sin(2\pi kC\Delta t)+Q(k)\sin(2\pi kC\Delta t)$$
Formula (1)

where C is a constant and $\Delta t$ is a preset value. Note that $\Delta t$ is so determined as be common to all subcarriers.

Similar to the second correlation unit 78b, the third correlation unit 78c to the Nth correlation unit 78n each stores beforehand the value, which is obtained by rotating the value of "TS" by a predetermined phase, in units of subcarrier. However, in the second correlation unit 78b to the Nth correlation unit 78n, $\Delta t$ differs mutually among them. That is, the value of $\Delta t$ becomes larger in the order of the second correlation unit 78b to the Nth correlation unit 78n. That is, a plurality of correlation units 78 each stores the value of "TS" which is rotated by a mutually different phase. Each $\Delta t$ equals a timing difference, and the correlation units 78 can be said to store the values of "TS" associated with mutually different timings.

Each of the plurality of correlation units 78 derives a value of correlation between a frequency-domain OFDM signal and a stored value. More specifically, the correlation unit 78 multiplies the frequency-domain OFDM by the stored value in units of subcarrier and accumulates the multiplication results. Since, as described earlier, the timing of TS stored in each correlation unit 78 differs, the timing associated with the timing derived by each correlation unit 78 differs as well. The correlation units 78 output the correlation values to the accumulation unit 80.

The accumulation unit 80 receives the correlation values fed from the plurality of correlation units 78, respectively, and combines some of the plurality of correlation values so as to be accumulated. For example, the accumulation unit 80 accumulates correlation values fed from the first correlation unit 78a to the third correlation unit 78c. That is, the accumulation unit 80 combines together the correlation values fed from the correlation units 78 that store "TSs" whose rotation amounts of phase are mutually close to each other. Also, the accumulation unit 80 derives a plurality of accumulated values by varying the combination. For example, the accumulation unit 80 derives an accumulated value for the second correlation unit 78b to the fourth correlation unit 78d, and/or derives an accumulated value for the third correlation unit 78c to the fifth correlation 78e. The "TS" stored is associated with an amount of timing shift; the first correlation unit 78a is defined as a front part, whereas the Nth correlation unit 78n is defined as a rear part. In such a case, the accumulation unit 80 derives a plurality of accumulated values by shifting the accumulation range that covers a front part to a rear part. Note that the accumulation range may be predetermined.

The detection unit 82 detects a characteristic point, such as a maximum value, of a plurality of accumulated values derived by the accumulation unit 80, and thereby detects the timing difference for the OFDM signal. Note that the detection unit 82 associates beforehand the accumulation ranges of accumulated values derived by the accumulation unit 80 with the amount of timing differences. The detection unit 82 identifies the amount of timing difference, based on an accumulation range associated with the maximum value of the accumulated values. The detection unit 82 conveys the identified amount of timing difference to the not-shown reception unit 22.

Figure 14:
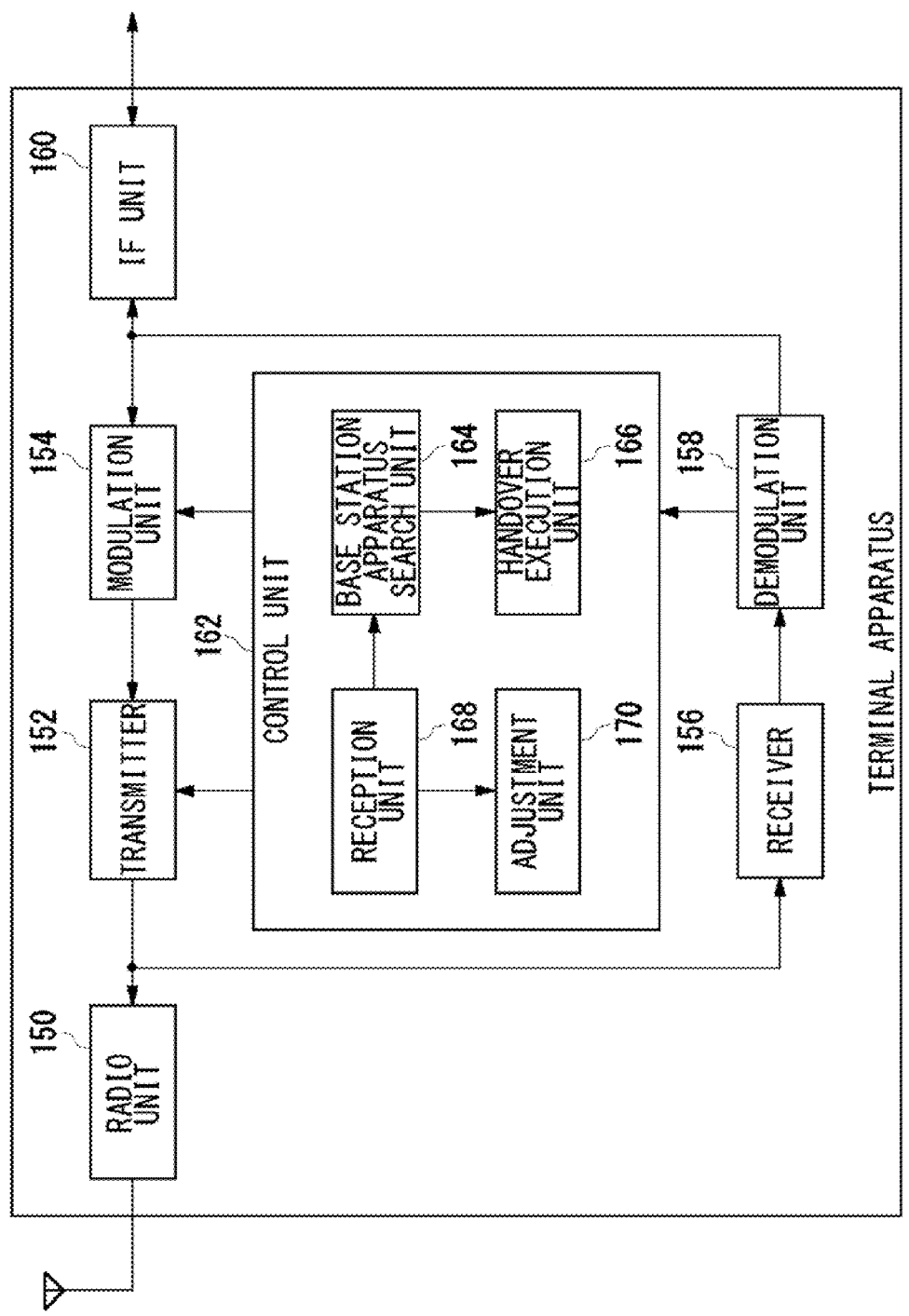
FIG. 14 shows a structure of a terminal apparatus shown in FIG. 1.

FIG. 14 shows a structure of the terminal apparatus 2. The terminal apparatus 2 includes a radio unit 150, a transmitter 152, a modulation unit 154, a receiver 156, a demodulation unit 158, an IF unit 160, and a control unit 162. The control unit 162 includes a base station apparatus search unit 164, a handover execution unit 166, a reception unit 168, and an adjustment unit 170.

The IF unit 160 is equipped with a microphone, a speaker, a keyboard and a display, and receives information sent from a user and presents information to the user. The IF unit 160, which is connected to a not-shown PC, may transmit information to and from the PC. For example, the microphone and the speaker are used during verbal communications, whereas the keyboard and the display are used during data communications.

The radio unit 150, the transmitter 152, the modulation unit 154, the receiver 156 and the demodulation unit 158 are equivalent to the radio unit 101, the transmitter 102, the modulation unit 103, the receiver 104 and the demodulation unit 105, respectively, and therefore the description thereof is omitted here. The terminal apparatus 2 communicates with the base station apparatus 1 via the radio unit 150 and the like. During the communications therebetween, the processing corresponding to the above-described radio resource allocation in the base station apparatus 1 is carried out in the terminal apparatus 2. In an initial state, the radio unit 150 and the like communicate with a handover source base station apparatus. As described earlier, the handover source base station apparatus corresponds to the first base station apparatus 1*a* of FIG. 1. The reception unit 168 receives instructions as to the above-described transmit timing, from the not-shown base station apparatus 1 via the radio unit 150, the receiver 156 and the demodulation unit 158. The reception unit 168 outputs the instruction as to the transmit timing, to the adjustment unit 170.

The adjustment unit 170 adjusts the transmit timing according to the instructions received by the reception unit 168. If it is instructed to shift the transmit timing by "−T", the adjustment unit 170 shifts the transmit timing by "−T" in the next frame. The IF unit 160, the modulation unit 154, the transmitter 152 and the radio unit 150 transmit the burst signal, with the transmit timing shifted by "−T", to the base station apparatus 1. Also, there may be cases where the reception unit 168 receives an instruction to perform a handover, instead of the instruction as to the transmit timing.

Upon receipt of the instruction fed from the reception unit 168, the base station apparatus search unit 164 searches for a handover destination base station apparatus. The base station apparatus search unit 164 receives LCCH assigned to SC1, and identifies LCCH whose received power becomes the maximum. Further, the base station apparatus search unit 164 selects a base station apparatus 1 associated with the thus identified LCCH, as the handover destination base station apparatus. For example, the second base station apparatus 1*b* of FIG. 1 is selected as the handover destination base station apparatus. The base station apparatus search unit 164 conveys the selected base station apparatus 1 to the handover execution unit 166. The handover execution unit 166 instructs the radio unit 150 and the like to execute the handover to the selected base station apparatus 1. Since the handover is executed similar to the radio resource allocation, the description thereof is omitted here.

Figure 15:
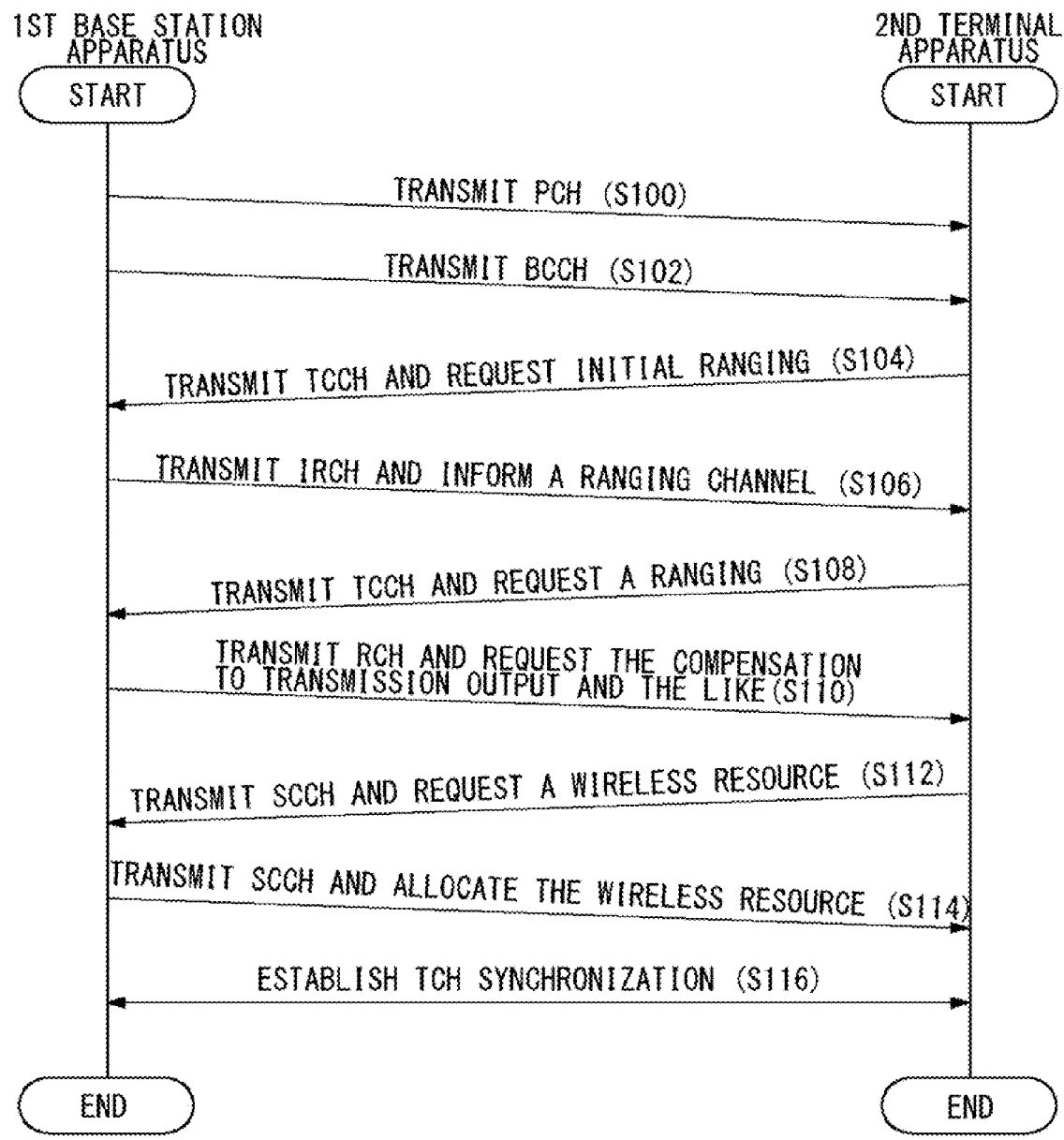
FIG. 15 is a sequence diagram showing a procedure for establishing the synchronization of TCH in the communication system of FIG. 1.

An operation of the communication system 20 configured as above will now be described. FIG. 15 is a sequence diagram showing a procedure for establishing the synchronization of TCH in the communication system 20. The base station apparatus 1, which stores the terminal number assigned to the terminal apparatus 2, together with other base station apparatuses belonging to the paging area, transmit PCH all at once (S100). The base station apparatus 1 transmits BCCH with predetermined timing (S102). If its own terminal number is contained in PCH, the terminal apparatus 2, which has received PCH, will identify the base station apparatus 1 and then store the source identifying information in TCCH; thereafter, the terminal apparatus 2 transmits TCCH and requests the first initial ranging (S104). The base station apparatus CS1 separates the source identifying information UID of the terminal apparatus 2 from the received TCCH and assigns an unused TCH to the terminal apparatus 2.

Then the base station apparatus CS1 stores the slot number and the subchannel number of the assigned TCH in IRCH and transmits them to the terminal apparatus 2 so as to convey TCH, through which the second initial ranging is carried out, to the terminal apparatus 2 (S106). The terminal apparatus 2 stores the source identifying information in TCCH and transmits it to the base station apparatus 1 using the assigned TCH for use in initial ranging so as to request the second initial ranging (S108). The base station apparatus 1 carries out a ranging process using TCH assigned to the terminal apparatus 2, stores the timing alignment control, the transmit output control and the transmit and receive timings of SCCH in RCH, and transmits them to the terminal apparatus 2 so as to request the correction of the transmit output and the like (S110). The terminal apparatus 2 extracts a correction value requested from the base station apparatus 1, from the received RCH and corrects the transmit output and the like.

Then, using TCH for use in initial ranging, the terminal apparatus 2 requests the base station apparatus 1 to allocate the radio resource (S112). The base station apparatus 1 performs FEC decoding processing and the like on a radio resource allocation requesting message, and assigns an unused TCH to the terminal apparatus 2. Then, the base station apparatus 1 stores the slot number and the subchannel number of the assigned TCH in SCCH and transmits them to the terminal apparatus 2 (S114). The above-described steps establish the synchronization of TCH and therefore, from this time on, the base station apparatus 1 and the terminal apparatus 2 receive and transmit data from and to each other using the synchronization-established TCH (S116).

Figure 16:
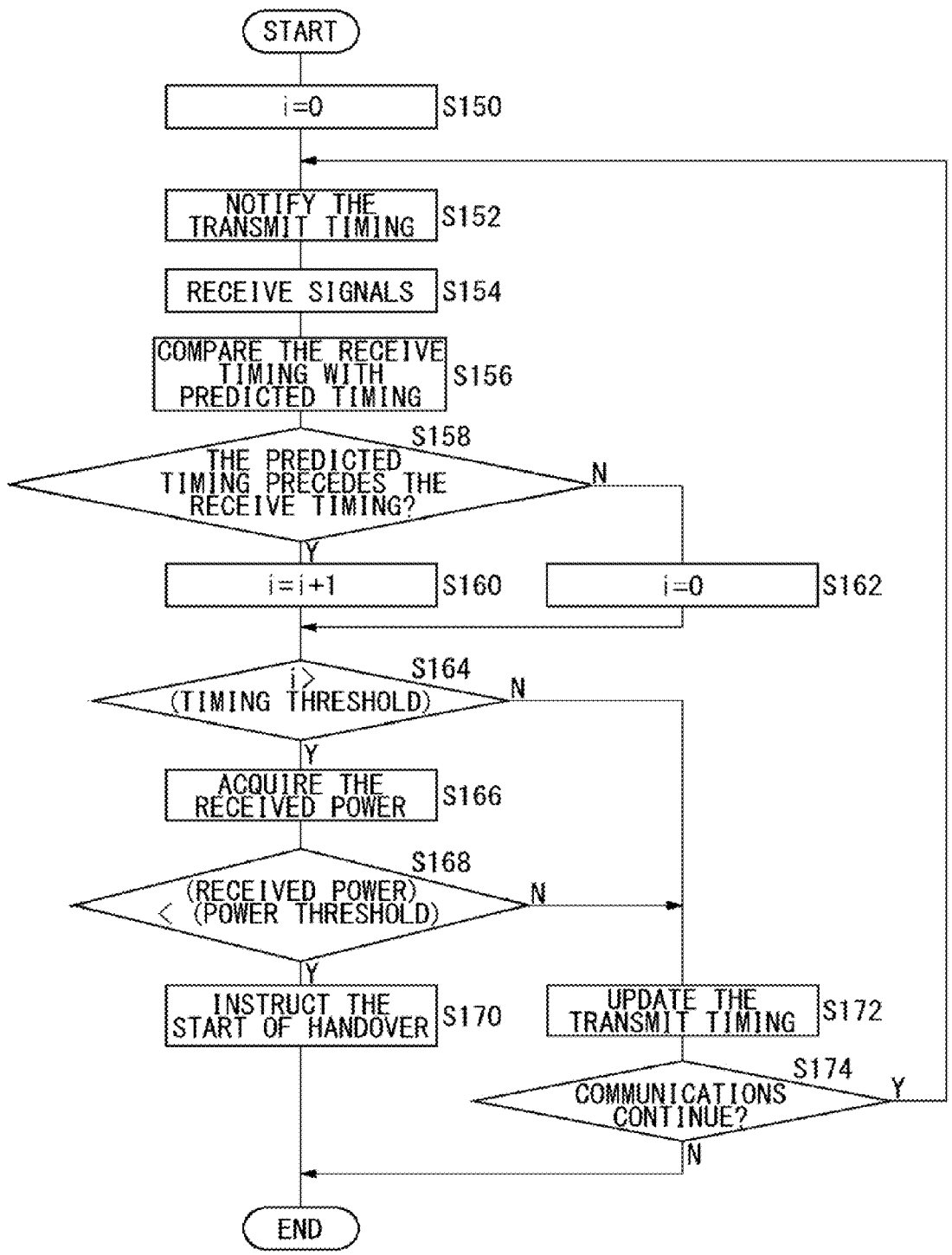
FIG. 16 is a flowchart showing a procedure for timing alignment in the base station of FIG. 6.

FIG. 16 is a flowchart showing a procedure for timing alignment in the base station 1. The determining unit 128 sets a variable "i" to "0" (S150). The notification unit 120 conveys the transmit timing to the terminal apparatus 2 via the modulation unit 103, the transmitter 102 and the radio unit 101 (S152). The demodulation unit 105 receives the burst signal sent from the terminal apparatus 2 (S154). The demodulation unit 105 compares the predicted timing with the receive timing (S156). If the predicted timing precedes the receive timing (Y of S158), the determining unit 128 will add "1" to "i" (S160). If, on the other hand, the predicted timing does not precede the receive timing (N of S158), the determining unit 128 will change "i" back to "0". (S162).

If "i" is greater than a timing threshold value (Y of S164), the determining unit 128 will acquire the received power measured by the measurement unit 126 (S166). If the received power is less than a power threshold value (Y of S168), the determining unit 128 will instruct the terminal apparatus 2 to start of a handover, via the modulation unit 103, the transmitter 102 and the radio unit 101 (S170). If, on the other hand, the "i" is not greater than the timing threshold value (N of S164) or the received power is not less than the power threshold value (N of S168), the determining unit 128 will update the transmit timing (S172). If the communication is still ongoing (Y of S174), the procedure will return to Step 152. If the communication is no longer active (N of S174), the processing will be terminated.

A description is now given of a modification to the exemplary embodiment. Similarly to the exemplary embodiment, the base station apparatus 1 determines the start of a handover for the terminal apparatus 2, in the modification. Further, similar to the exemplary embodiment, the base station apparatus 1 according to the modification uses the amount of timing difference between the receive timing and the predicted timing and the received power. However, the base station apparatus according to the modification defines the timing threshold value but does not define the power threshold value. The base station apparatus adjusts the timing threshold value according to the received power, and uses the thus adjusted timing threshold value in a similar manner to the exemplary embodiment. The communication system 20 according to the modification is of a similar type to the communication system 20 shown in FIG. 1, and the base station apparatus 1 according to the modification is of a similar type to the base station apparatus 1 shown in FIG. 6 and the terminal apparatus 2 according to the modification is of a similar type to the terminal apparatus 2 shown in FIG. 14. A description is given here of the modification centering around differences from the exemplary embodiment.

Similar to the exemplary embodiment, the determining unit 128 receives the received power from the measurement unit 126. Also, the determining unit 128 adjusts the timing threshold value, based on the received power received thereby. For example, as the received power becomes lower, the determining unit 128 determines the timing threshold value in a manner such that the timing threshold value becomes smaller. Also, the determining unit 128 compares the measured number of consecutive occurrences with the timing threshold value. If the number of consecutive occurrences is larger than the timing threshold value, the determining unit 128 will determine the start of a handover for the terminal apparatus 2. With such a control described as above, the situation is more likely to be eliminated where the number of consecutive occurrences is large due to the fact that the amount of initial receive timing difference is too large even though the terminal apparatus 2 is located near the base station apparatus 1. As a result, the precision in the determination of the start of a handover is improved.

Figure 17:
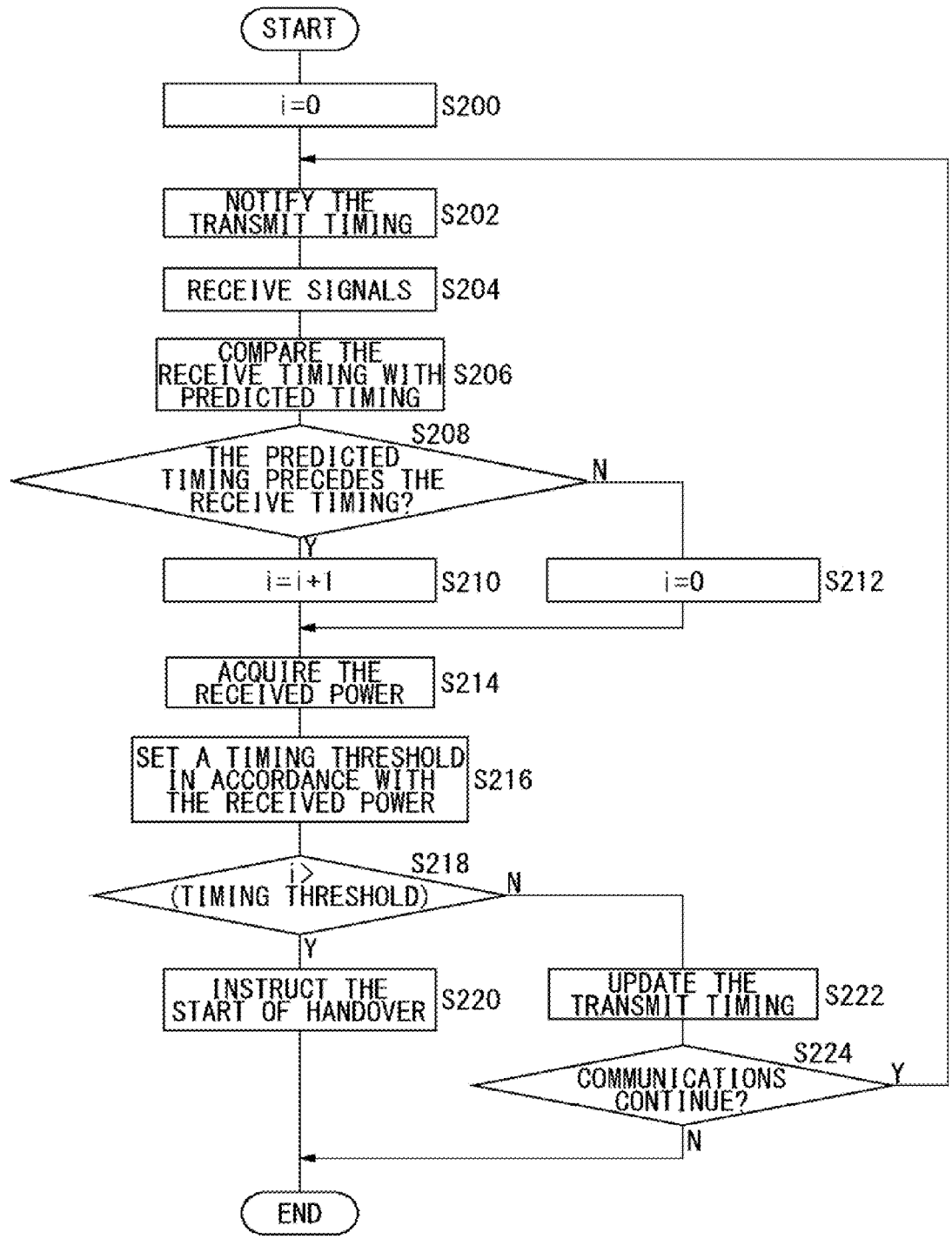
FIG. 17 is a flowchart showing a procedure for timing alignment in a base station apparatus according to a modification.

FIG. 17 is a flowchart showing a procedure for timing alignment in a base station apparatus 1 according to the modification. The determining unit 128 sets a variable "i" to "0" (S200). The notification unit 120 conveys the transmit timing to the terminal apparatus 2 via the modulation unit 103, the transmitter 102 and the radio unit 101 (S202). The demodulation unit 105 receives the burst signal sent from the terminal apparatus 2 (S204). The demodulation unit 105 compares the predicted timing with the receive timing (S206). If the predicted timing precedes the receive timing (Y of S208), the determining unit 128 will add "1" to "i" (S210). If, on the other hand, the predicted timing does not precede the receive timing (N of S208), the determining unit 128 will change "i" back to "0". (S212).

The determining unit 128 acquires the received power from the measurement unit 126 (S214) and sets a timing threshold value according to the received power (S216). If "i" is greater than the timing threshold value (Y of S218), the determining unit 128 will instruct the terminal apparatus 2 to start of a handover, via the modulation unit 103, the transmitter 102 and the radio unit 101 (S220). If, on the other hand, the "i" is not greater than the timing threshold value (N of S218) the determining unit 128 will update the transmit timing (S222). If the communication is still ongoing (Y of S224), the procedure will return to Step 202. If the communication is no longer active (N of S224), the processing will be terminated.

By employing the exemplary embodiment of the present invention, the case where the number of consecutive occurrences of the state where the receive timing lags the predicted timing is larger than the timing threshold value is identified. Thus the case where the terminal apparatus travels away from the base station apparatus can be identified. Since the case where the number of consecutive occurrences of the state where the receive timing lags the predicted timing is larger than the timing threshold value is identified, the timing at which the terminal apparatus moves out of the service area formed by the handover source base station apparatus can be detected. Since the case where the terminal apparatus travels away from the base station apparatus is identified, the start of a handover can be accurately instructed.

Since the execution of a handover is instructed when the received power is larger than the power threshold value, the situation can be eliminated where the number of consecutive occurrences is large due to the fact that the amount of initial receive timing difference is too large even though the terminal apparatus is located near a base station apparatus. Since the situation, where the number of consecutive occurrences is large due to the fact that the amount of initial receive timing difference is too large even though the terminal apparatus is located near the base station apparatus, is eliminated, the start of a handover can be accurately instructed. Since the timing threshold value is adjusted according to the received power, whether the terminal apparatus is moving away from a base station apparatus or not can be taken into consideration. Since the timing threshold value is made smaller if the received power is small, the execution of a handover is facilitated.

The first TCCH and IRCH are assigned to the frequency band where a plurality of base station apparatus are time-division multiplexed. Here, this frequency band is one in which a periodic signal such as BCCH and PCH is assigned. Thus, the collision of TCCHs and the collision between TCCHs and TCHs of other base station apparatuses can be avoided. With the above-described assignment, a dedicated subchannel for the initial ranging can be omitted. Since the dedicated subchannel for the initial ranging is omitted, the transmission efficiency can be improved. Since a plurality of ranging processes are executed in stages, the multiple processing can be carried out. Since a plurality of ranging processes are executed in stages, the channels can be allocated to a plurality of terminal apparatuses. Since the channel allocation processing is scheduled by time-division multiplexing, the channel can be assigned to a plurality of terminal apparatuses.

Since the channel allocation processing is scheduled by time-division multiplexing, adaptive array transmission can be done. Since the first TCCH and IRCH are assigned between broadcast signals such as BCCH and PCH, the transmit/receive intervals of the first TCCH and IRCH can be reduced. Since the transmit/receive intervals of the first TCCH and IRCH is reduced, the time duration between when an incoming call signal is recognized and when a communication is started can be reduced. Since the time duration between an incoming call signal is recognized and when a communication is started is reduced, the responsiveness to the incoming call signal can be improved. Since the transmit/receive intervals of the first TCCH and IRCH is reduced, the channel can be assigned at high speed. Since TCCH is assigned in such manner as to be associated with BCCH, IRCH and PCH, respectively, the chance of transmitting TCCHs by the terminal apparatus can be increased.

The present invention has been described based on the exemplary embodiment and the modification. The exemplary embodiment is intended to be illustrative only, and it is understood by those skilled in the art that various modifications to constituting elements and processes could be further developed and that such modifications are also within the scope of the present invention.

In the exemplary embodiment of the present invention, the wireless communication scheme used for communications between the base station apparatus 1 an and the terminal apparatus 2 is OFDMA. However, this should not be considered as limiting and other schemes other than OFDMA may be used. In such a case, the ranging process executed between the terminal apparatus 2 and the base station apparatus 1 is omitted. According to this modification, various wireless communication schemes are applicable to the present invention.

In the exemplary embodiment of the present invention, the determining unit 128 instructs the terminal apparatus 2 to start a handover if the number of consecutive occurrences is greater than the timing threshold value and the received power is greater than the power threshold value. However, this should not be considered as limiting and, for example, the determining unit 128 may instruct the terminal apparatus 2 to start a handover if the number of consecutive occurrences is greater than the timing threshold value and the received power is degraded over time. In such a case, the received power from the measurement unit 126 is received at predetermined intervals, and the determining unit 128 calculates the slope of variation in the received power. According to this modification, the case when the received power is small is identified using a plurality of samples, so that the measurement accuracy can be improved.

In the exemplary embodiment of the present invention, the determining unit 128 measures the number of consecutive occurrences of a state where the receive timing lags the predicted timing. However this should not be considered as limiting and, for example, the number of times when the receive timing lags the predicted timing over a predetermined period of time may be measured. In other words, the probability of the occurrence of the above-described state may be measured. According to this modification, the adverse effect by noise and like can be reduced. In other words, it suffices that the start of a handover is instructed when the occurrence frequency of the above state becomes high.

INDUSTRIAL APPLICABILITY

The present invention detects the timing at which a terminal apparatus moves out of a service area formed by a handover source base station apparatus.

What is claimed is:

1. A base station apparatus, comprising:
a notification unit configured to convey a transmit timing of a signal to a terminal apparatus;
a receiver configured to receive the signal transmitted from the terminal apparatus after the transmit timing is conveyed from said notification unit;
a derivation unit configured to derive a displacement of timing between a first receive timing in said receiver and a second receive timing estimated based on the transmit timing in said notification unit; and
a determining unit configured to determine a new transmit timing for the terminal apparatus, based on the displacement of timing derived by said derivation unit and configured to output the new transmit timing determined thereby to said notification unit,
wherein when a number of consecutive occurrences in which the first receive timing lags the second receive timing is larger than a threshold value, said determining unit instructs the terminal apparatus to start a handover.

2. The base station apparatus according to claim 1, further comprising a measurement unit configured to measure the strength of the signal received by said receiver,
wherein when the number of consecutive occurrences in which the first receive timing lags the second receive timing is larger than the threshold value and the strength measured by said measurement unit is lower than a strength threshold value, said determining unit instructs the terminal apparatus to start a handover.

3. The base station apparatus according to claim 1, further comprising a measurement unit configured to measure the strength of the signal received by said receiver,
wherein said determining unit adjusts the value of the threshold value according to the strength measured by said measurement unit.

4. A communication method in a base station apparatus, comprising:
conveying a transmit timing of a signal to a terminal apparatus;
receiving the signal transmitted from the terminal apparatus after the transmit timing is conveyed,
deriving a displacement of timing between a first receive timing of the received signal and a second receive timing estimated based on the transmit timing; and
determining a new transmit timing for the terminal apparatus, based on the derived displacement of timing,
wherein when a number of consecutive occurrences in which the first receive timing lags the second receive timing is larger than a threshold value, said determining instructs the terminal apparatus to start a handover.

* * * * *